April 30, 1929.  H. SAUVEUR  1,711,427
RELEASABLE DRILL HOLDER
Filed April 6, 1925
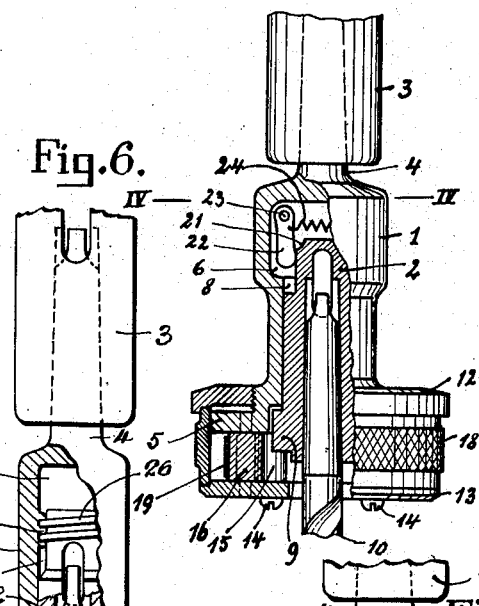
Fig.1
Fig.2
Fig.6.
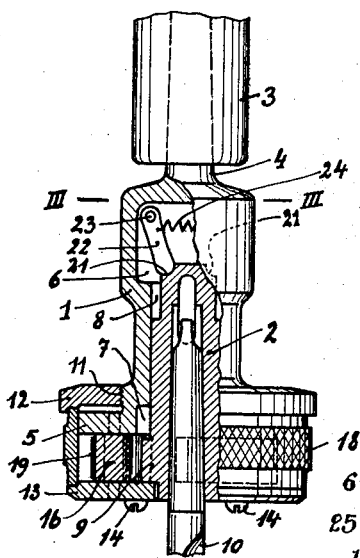
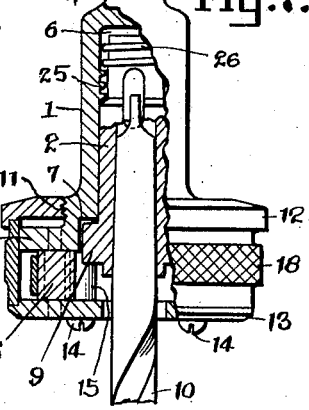
Fig.7.
Fig.3.
Fig.4.
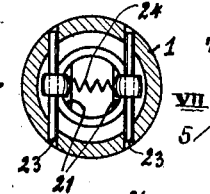
Fig.5.
Inventor:
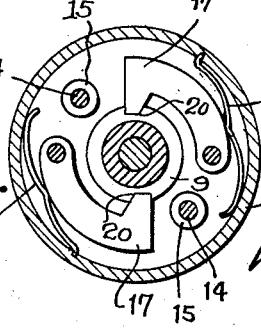

Patented Apr. 30, 1929.

1,711,427

UNITED STATES PATENT OFFICE.

HARRY SAUVEUR, OF BERLIN, GERMANY.

RELEASABLE DRILL HOLDER.

Application filed April 6, 1925, Serial No. 21,234, and in Germany May 16, 1924.

This invention of improvements relating to drills has relation to drills that are fed forward automatically and has for its object the provision of means which shall come into operation automatically to interrupt the feed of the drill when the torsion to which it is subjected exceeds a certain amount and so safeguard it from damage.

It has already been proposed to provide drills with means to disconnect them automatically from their drives when the torsion to which they are subjected exceeds a predetermined amount. Such means are sufficient for drills in which the feed movement is effected by hand, but with drills fed forward automatically there is a risk that the drill will nevertheless be damaged or destroyed owing to its feed movement which continues even when it is disconnected from its drive.

The present invention obviates this risk and in accordance therewith, the drill, when disconnected from its drive, is at the same time disconnected from the feed mechanism and permitted to move endwise relatively to the drill spindle so that the feed movement of the latter has no effect thereon.

In order that the invention may be clearly and readily understood, reference will now be made to the two constructional embodiments illustrated on the accompanying sheets of drawings on which:—

Figs. 1 and 2 are sectional elevational views of one embodiment of the invention, the parts being shown in different positions;

Figs. 3 and 4 are cross sectional views on the lines III—III and IV—IV of Figs. 1 and 2, respectively;

Fig. 5 is a cross section showing the pawls and their springs, and

Figs. 6 and 7 are sectional elevational views of a second embodiment of the invention, the parts being shown in different positions.

Referring now to Figs. 1 to 5 inclusive—

The drill holder consists of the parts 1 and 2 of which the part 1 is mounted in the drill spindle 3 by means of a Morse taper 4. The drill spindle 3 is rotated and is also fed downwardly automatically by any convenient means, which, as they form no part of the present invention, are not illustrated.

Each of the parts 1, 2 comprises a hollow member closed at one end. The part 2 is contained within the part 1 and is rotatable and axially movable therein. The part 2 is restrained against these movements, except when it meets with excessive resistance, by the means hereinafter described.

The Morse taper 4 is integral with the part 1 which has an external flange 5 at its open end. The bore of the part 1 is not uniform throughout the whole of its length, but is larger at its ends. The increase in the diameter of the bore forms a chamber 6 at its closed end and a recess 7 at its open end.

The part 2 is of reduced diameter at its closed end as indicated at 8 and of increased diameter at its open end as indicated at 9. The diameter of the portion 9 is such that when the part 2 is moved axially and inwardly into the part 1 it can enter the recess 7. The part 2 serves to receive and hold the drill 10.

The part 1 is screw threaded externally above the flange 5 as indicated at 11 and on this screw threaded portion an annular disc 12 is mounted. 13 is a second annular disc. The discs 12 and 13 are of like diameter, which diameter is greater than that of the flange 5. The disc 13 is secured to, but spaced from, the underside of the flange 5, the attachment being effected by screws 14 which pass through distance or spacing pieces 15. 16 are pins mounted in the flange 5 and disc 13. 17 are pawls mounted on the pins 16 and 18 is a cylindrical sleeve mounted between the discs 12 and 13 and enclosing the flange 5 and pawls 17. The sleeve 18 carries springs 19 which bear on the pawls 17.

The portion 9 of the part 2 is formed with teeth or, as shown, with recesses 20 with which the pawls 17 engage. The pawls 17 and recesses 20 constitute a coupling between the parts 1 and 2. The sleeve 18 is rotatable in its mounting. By rotation of the sleeve 18 the positions of the springs 19 in relation to the pawls are altered and the force required to disengage the pawls from the recesses is varied.

The part 2 is cut away at its closed end to form seats 21 for pawls 22. The seats 21 are at the opposite ends of a diameter and the pawls 22 are carried by pins 23 mounted in the walls of the chamber 6. The pawls 22 are connected together by a spring 24.

In operation when the drill is functioning normally, the parts occupy the positions shown in Fig. 1. Should it encounter excessive resistance and be retarded, the coupling 19 and 20 is broken and the part 1 moves in a rotary sense in relation to the part 2. As soon as this relative rotary motion occurs, the pawls 22 are forced out of their seats 21 and engage the part 2 as shown in Fig. 4. The drill 10 is thus released from the drill spindle 3, the automatic downward feed of which causes the part 1 to move axially relatively to the part 2 so that the parts 1 and 2 assume the positions shown in Fig. 2. The arrangement permits of the continuance of the automatic feed for a time without risk of damage to any part and gives the operator time in which to stop the machine.

In the second embodiment of the invention illustrated in Figs. 6 and 7, the pawls 22 and seats 21 are dispensed with and in lieu thereof the parts 1 and 2 are provided with interengaging screw threads 25 and 26 which when relative rotation of the parts 1 and 2 is set up are disengaged.

When the drilling machine has been stopped, the parts 1 and 2 can be easily and quickly restored to their operative positions.

What I claim is:—

1. A drill holder for drilling machines with automatic feed comprising a drill holding member proper, a second member mounted in the drill spindle and to contain said drill holding member, said members being capable of relative rotary and axial movements, a clutch to connect said members together against relative rotary motion and comprising yielding pawls mounted on the second member and recesses in the drill holding member, and means to prevent relative axial movement of said parts when the clutch is operative comprising a pair of pawls mounted in the second member to engage recesses in the drill holding member, said means becoming inoperative when the clutch yields.

2. A drill holder for drilling machines having an automatic feed comprising a drill holder consisting of two parts, one of the parts of said holder fitting into a drill spindle and the other part fitting into the first-mentioned part and holding the drill; a clutch mechanism associated with said parts to connect them together and hold them against rotary motion relative to each other, said clutch being adapted to yield under overload; and a coupling adapted to hold said parts against axial movement relative to each other and adapted to automatically become inoperative when the clutch is overloaded to permit axial movement of one part relative to the other during the continued automatic feed.

3. A drill holder for drilling machines having an automatic feed comprising a drill holder comprising two parts, one of said parts being adapted to fit into a drill spindle and the other part associated with the first-mentioned part and adapted to hold the drill; a clutch mechanism associated with said parts to connect them together against rotary motion relative to each other, said clutch being adapted to yield under overload; and means for holding said parts against axial movement relative to each other and adapted to automatically become inoperative when the clutch is overloaded to permit axial movement of one part relative to the other during the continued automatic feed.

4. A drill holder for drilling machines having an automatic feed comprising a drill holder comprising two parts, one of said parts being adapted to fit into a drill spindle and the other part fitting in the first-mentioned part and adapted to receive and hold a drill; a clutch mechanism associated with said parts of the holder to connect them together against rotary motion relative to each other, said clutch being adapted to yield under overload; and a spring-controlled coupling for holding said parts against axial movement relative to each other but adapted to automatically become inoperative when the clutch is overloaded to permit the spindle part of the holder to move axially on the drill part of the holder during the continued automatic feed.

5. A drill holder for drilling machines having an automatic feed comprising a drill holder comprising two parts, one of said parts being adapted to fit into a drill spindle and the other part fitting in the first-mentioned part and adapted to receive and hold a drill; a clutch mechanism associated with said parts of the holder comprising spring pressed pawls to connect the parts together against rotary motion relative to each other, said clutch being adapted to yield under overload; and a coupling comprising spring controlled pawls mounted in one part and bearing against a shoulder upon the other part for holding said parts against axial movement relative to each other but adapted to automatically become inoperative when the clutch is overloaded to permit the spindle part of the holder to slide axially on the drill part of the holder during the continued automatic feed.

Dated this 16th day of March 1925.

HARRY SAUVEUR.